United States Patent
Rojas et al.

(10) Patent No.: US 9,634,724 B2
(45) Date of Patent: Apr. 25, 2017

(54) ENERGY DELIVERY ON PATHS USED FOR COMMUNICATION

(71) Applicant: OSRAM SYLVANIA Inc., Danvers, MA (US)

(72) Inventors: Javier Rojas, Mississauga (CA); Marc Hoffknecht, Newmarket (CA); Liam O'Hagan, Walkerton (CA)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/378,389

(22) PCT Filed: Apr. 1, 2013

(86) PCT No.: PCT/US2013/034862
§ 371 (c)(1),
(2) Date: Aug. 13, 2014

(87) PCT Pub. No.: WO2013/149262
PCT Pub. Date: Oct. 3, 2013

(65) Prior Publication Data
US 2016/0049991 A1    Feb. 18, 2016

Related U.S. Application Data

(60) Provisional application No. 61/618,615, filed on Mar. 30, 2012.

(51) Int. Cl.
*H04B 3/54* (2006.01)
*H02J 4/00* (2006.01)
(Continued)

(52) U.S. Cl.
CPC ............. *H04B 3/542* (2013.01); *G06F 1/266* (2013.01); *H02J 4/00* (2013.01); *H04B 3/548* (2013.01);
(Continued)

(58) Field of Classification Search
CPC ... H04L 12/40045; H04L 25/02; H04L 12/10; H05B 37/0263; H05B 37/0254;
(Continued)

(56) References Cited

U.S. PATENT DOCUMENTS 4,926,158 A    5/1990 Zeigler
5,974,553 A *  10/1999 Gandar .................. H04L 25/02
                                                713/300
(Continued)

FOREIGN PATENT DOCUMENTS

DE    10 2010 002679 A1    9/2011
EP         0 822 684 A1    2/1998
(Continued)

OTHER PUBLICATIONS

Monica Ferla, International Search Report and Written Opinion of the International Searching Authority for PCT/US2013/034862, Sep. 17, 2014, pp. 1-18, European Patent Office, Rijswijk, The Netherlands.

(Continued)

*Primary Examiner* — Michelle M Koeth
(74) *Attorney, Agent, or Firm* — Shaun P. Montana

(57) ABSTRACT

Systems and methods for delivering energy on a bus used for communication between devices are provided. Systems and methods dynamically provide a predetermined recovery time between communication messages calculated from forward and response message types and/or length, and a model of the energy reserve in the network devices to allow time for energy storage circuits in the devices to charge. In addition or alternatively, systems and methods provide an extra recovery time between messages to allow the bus voltage to recover from a fold-back mode and/or include an extra current limit circuit to increase a power supply current when the combined energy required by the network devices is greater than a current limit on a power supply.

14 Claims, 5 Drawing Sheets

(51) Int. Cl.
*H04L 12/10* (2006.01)
*H05B 37/02* (2006.01)
*G06F 1/26* (2006.01)

(52) U.S. Cl.
CPC ......... *H04L 12/10* (2013.01); *H05B 37/0254* (2013.01)

(58) Field of Classification Search
CPC ......... H04B 3/542; H04B 3/548; G06F 1/266; H02J 4/00
See application file for complete search history.

(56) References Cited

U.S. PATENT DOCUMENTS

| | | | |
|---|---|---|---|
| 8,344,659 B2 * | 1/2013 | Shimomura | H05B 37/0245 315/169.3 |
| 2008/0276154 A1 | 11/2008 | Hick et al. | |
| 2008/0298385 A1 * | 12/2008 | Ng | H04L 12/40032 370/445 |
| 2009/0003481 A1 | 1/2009 | Schopfer et al. | |
| 2009/0193268 A1 | 7/2009 | Kreiner et al. | |
| 2011/0035511 A1 * | 2/2011 | Biederman | G04G 7/00 709/248 |

FOREIGN PATENT DOCUMENTS

| | | | |
|---|---|---|---|
| EP | 0822684 A1 * | 2/1998 | H04L 12/10 |
| EP | 1 372 270 A1 | 12/2003 | |

OTHER PUBLICATIONS

Lars Theunissen, Communication Relating to the Results of the Partial International Search for PCT/US2013/034862, May 12, 2014, p. 1-3, European Patent Office, Rijswijk, The Netherlands.

* cited by examiner

ENERGY DELIVERY ON PATHS USED FOR COMMUNICATION

CROSS-REFERENCE TO RELATED APPLICATIONS

The present application is a National Stage application of, and claims priority to, International Application No. PCT/US2013/034862, filed Apr. 1, 2013 and entitled "ENERGY DELIVERY ON PATHS USED FOR COMMUNICATION", which claims priority of U.S. Provisional Patent Application No. 61/618,615, filed Mar. 30, 2012 and entitled "COMMUNICATION THROTTLING MECHANISM FOR TWO WIRE SYSTEMS", the entire contents of both of which are hereby incorporated by reference.

TECHNICAL FIELD

The present invention relates to energy delivery, and more specifically, to energy transmission on paths used for communication.

BACKGROUND

Network configurations wherein power and communication signals are delivered to network devices using the same bus are known in the art. One such network configuration uses what is known as Digital Addressable Lighting Interface (DALI), which defines a network interface standard used for controlling lighting network devices. DALI is an example of a two-wire configuration, wherein a two-wire bus is coupled between the network devices to deliver power to the devices and to support communication between the devices. Communication is established on the bus in a DALI network by indicating a logical "1" with the presence of voltage between the two wires and a logical "0" by shorting of the two wires by any device.

In general, the devices in a network using the same bus for power supply and communication are only supplied with power at certain times during communication, e.g. between communication signals and/or during the time period of any logical "1" of a communication signal. A device with no auxiliary power, i.e. a device powered entirely by power delivered on the network bus, may therefore be configured to store energy to support operation of the device during times where no power can be obtained from the bus, and the device may replenish the stored energy at other times.

The current available from the bus in these configuration determines how long it takes to replenish stored energy in the network devices, but large in-rush currents during energy storage periods can distort the communication signals, e.g. the logical "1"s. To address this some systems add a current limit circuit to the network power supply. Adding a current limit to the power supply reduces the impact on the communication signals, but increases the time required to replenish the energy stored in the devices.

SUMMARY

Advantageously, embodiments disclosed herein dynamically provide a predetermined recovery time between communication messages calculated from forward and response message types and/or length, and a model of the energy reserve in the network devices to allow time for energy storage circuits in the devices to charge. In addition or alternatively, embodiments provide an extra recovery time between messages to allow bus voltage to recover from a fold-back mode and/or include an extra current limit circuit to increase a power supply current when the combined energy required by the network devices is greater than a current limit on a power supply. The predetermined recovery time described in connection with FIG. 2, extra recovery time described in connection with FIG. 3, and the extra current limit circuit described in connection with FIGS. 4-6 may be, and in some embodiments are, implemented alone or in any combination with each other. For example, embodiments may implement all three of these features, any two of these features, or any one of these features.

Dynamic control of energy delivery allows for improved communication speed compared to static systems, and prevents potential faults or intermittent communication to/from a device, resulting in fast and reliable communication. Dynamic energy control also allows more devices to be connected to a bus compared to systems without dynamic energy control. In systems wherein a power supply is provided with a current limit, when system devices require more energy than the current limit allows, the extra current limit circuit described in embodiments allows the energy devices in the network devices to recover more fully, thus allowing fast and reliable communication throughput.

In an embodiment, there is provided a system. The system includes: a bus; a plurality of devices coupled to the bus and configured to communicate with each other via the bus via one or more messages; and a master controller coupled to the bus and configured to supply power to the plurality of devices via the bus and to control communication between the plurality of devices, wherein the master controller is further configured to cause the plurality of devices to wait for a predetermined recovery time after a first message is communicated from a first device in the plurality of devices to a second device in the plurality of devices before the second device is able to communicate a second message to the first device, wherein the predetermined recovery time is calculated based on a time associated with the first message and the second message and an estimate of a time to charge an energy storage circuit in at least one of the devices in the plurality of devices.

In a related embodiment, the master controller may be further configured to monitor a voltage on the bus and, in response to the voltage, cause the plurality of devices to wait for an extra recovery time before the predetermined recovery time to allow the voltage to return to a first level from a second level, the second level being lower than the first level. In a further related embodiment, the master controller may further include an extra current limit circuit configured to increase an output current limit for the power supplied by the master controller in response to a control output of a controller, the control output being provided by the master controller in response to a voltage on the bus.

In another related embodiment, the master controller may further include an extra current limit circuit configured to increase an output current limit for the power supplied by the master controller in response to a control output of a controller, the control output being provided by the controller in response to the voltage on the bus. In a further related embodiment, the extra current limit circuit may include a metal oxide field effect (MOSFET) transistor switch, and the control output may be coupled to a gate of the MOSFET transistor switch.

In yet another further related embodiment, the first message may be a response message communicated by the first device in response to a forward message communicated from the second device and the second message may be a next forward message communicated from the second device.

In another embodiment, there is provided a system. The system includes: a bus; a plurality of devices coupled to the bus and configured to communicate with each other via the bus via one or more messages; and a master controller coupled to the bus and configured to supply power to the plurality of devices via the bus and to control communication between the plurality of devices, wherein the master controller is further configured to monitor a voltage on the bus and cause the plurality of devices to wait, in response to the voltage, for an extra recovery time after a first message is communicated from a first device in the plurality of devices to a second device in the plurality of devices to allow the voltage to return to a first level from a second level, the second level being lower than the first level.

In a further related embodiment, the master controller may further include an extra current limit circuit configured to increase an output current limit for the power supplied by the master controller in response to a control output of a control circuit, the control output being provided by the control circuit in response to the voltage on the bus. In a further related embodiment, the extra current limit circuit may include a metal oxide field effect (MOSFET) transistor switch, and the control output may be coupled to a gate of the MOSFET transistor switch.

In another further related embodiment, the first message may be a response message communicated in response to a forward message from the second device and the second message may be a next forward message communicated from the second device.

In another embodiment, there is provided a system. The system includes: a bus; a plurality of devices coupled to the bus and configured to communicate with each other via the bus via one or more messages; and a master controller coupled to the bus and configured to supply power to the plurality of devices via the bus and to control communication between the plurality of devices, wherein the master controller comprises an extra current limit circuit configured to increase an output current limit for the power supplied by the master controller in response to a control output of a control circuit, the control output being provided by the control circuit in response to a voltage on the bus.

In a further related embodiment, the extra current limit circuit may include a metal oxide field effect (MOSFET) transistor switch, and the control output may be coupled to a gate of the MOSFET transistor switch.

In another embodiment, there is provided a method of delivering energy to a plurality of devices via a bus that is also used for communication between the devices. The method includes: sending a forward message from a first device in the plurality of devices to a second device in the plurality of devices; sending a response message from the second device in response to the forward message; calculating a predetermined recovery time based on a time associated with the forward message and the response message and an estimate of a time to charge an energy storage circuit in at least one of the devices in the plurality of devices; and waiting for the predetermined recovery time before sending a next forward message on the bus.

In a related embodiment, the method may further include: monitoring a voltage on the bus; and waiting for an extra recovery time in response to the voltage before the predetermined recovery time to allow the voltage to return to a first level from a second level, the second level being lower than the first level. In a further related embodiment, the method may further include increasing an output current limit for power supplied on the bus in response to the voltage.

In another related embodiment, the method may further include increasing an output current limit for power supplied on the bus in response the voltage.

In another embodiment, there is provided a method of delivering energy to a plurality of devices via a bus that is also used for communication between the plurality of devices. The method includes: sending a forward message from a first device in the plurality of devices to a second device in the plurality of devices; sending a response message from the second device in response to the forward message; monitoring a voltage on the bus; and waiting for an extra recovery time after the response message in response to the voltage to allow the voltage to return to a first level from a second level, the second level being lower than the first level.

In a related embodiment, the method may further include increasing an output current limit for power supplied on the bus in response to the voltage.

In another embodiment, there is provided a method of delivering energy to a plurality of devices via a bus that is also used for communication between the plurality of devices. The method includes: monitoring a voltage on the bus; and increasing an output current limit for power supplied on the bus in response to the voltage.

In a related embodiment, the method may further include providing a control output in response to the voltage on the bus; and increasing an output current limit may further include increasing the output current limit in response to the control output.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
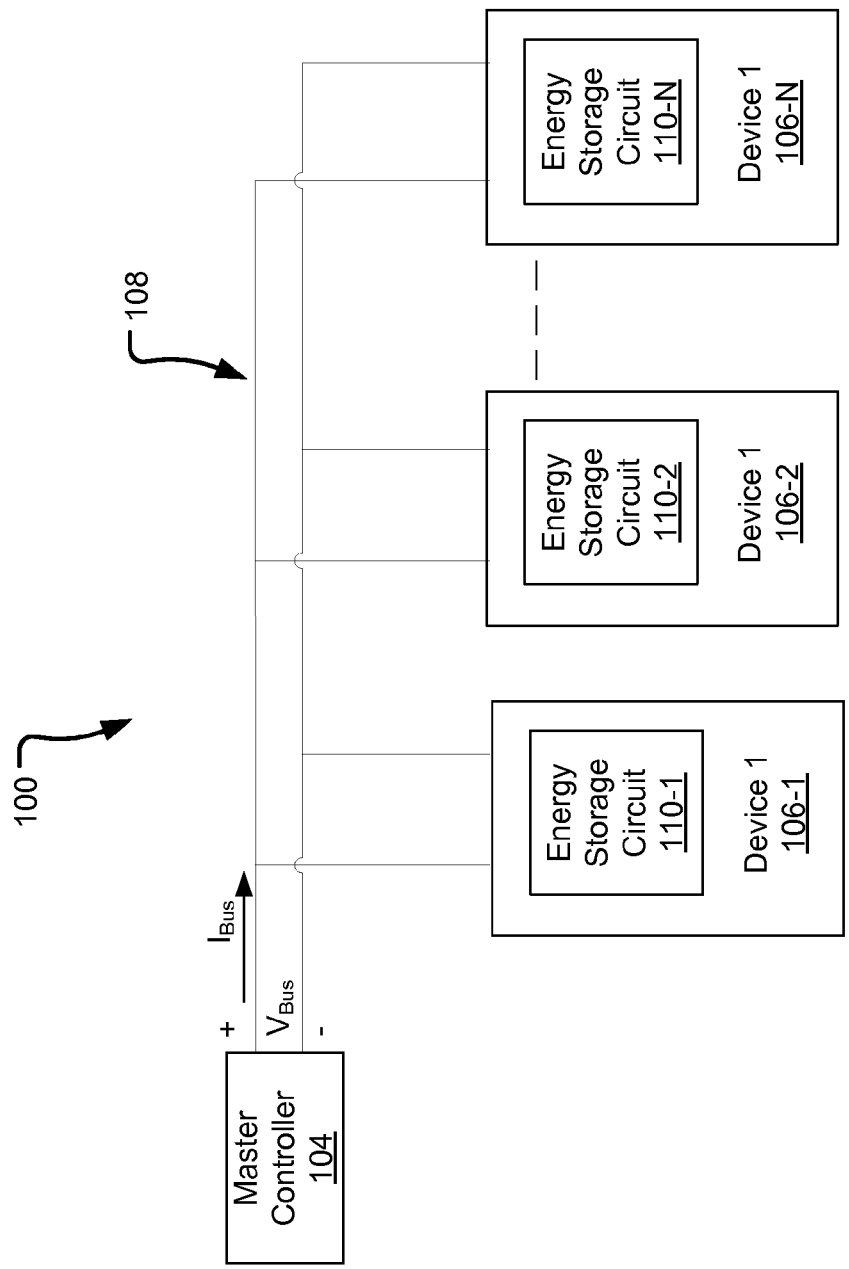
FIG. 1 is a block diagram of a system according to embodiments disclosed herein.

FIG. 1 is a simplified block diagram of a system 100. The system 100 includes a master controller 104 and a plurality of network devices (or "nodes" or "devices") 106-1, 106-2 . . . 106-N coupled to the master controller 104 by a two-wire bus 108. The system 100 may be, and in some embodiments is, configured as a DALI network. It is to be understood, however, that although embodiments may be described throughout with reference to a DALI configuration, embodiments may be implemented in any other suitable network configuration. The master controller 104 may take a known configuration for providing an output voltage $V_{Bus}$ on the bus 108 and an associated output current $I_{Bus}$. The output voltage $V_{Bus}$ is coupled to each of the plurality of network devices 106-1, 106-2 . . . 106-N. The output current $I_{Bus}$ may be, and in some embodiments is, variable or may be, and in some embodiments is, limited by the master controller 104. In some embodiments, the master controller 104 is configured in a known manner to operate in a "fold-back" mode to change the output current $I_{Bus}$ in response to the output voltage $V_{Bus}$. For example, in a DALI configuration, the master controller 104 may decrease its output current $I_{Bus}$ when the output voltage $V_{Bus}$ decreases as a result of one of the plurality of network devices 106-1, 106-2 . . . 106-N shorting the bus 108 in an attempt to communicate logical "0"s on the bus 108.

The master controller 104 may also facilitate communication between the plurality of network devices 106-1, 106-2 . . . 106-N. In some embodiments, the master controller 104 may act as a bus arbiter to declare the bus 108 free for any network device in the plurality of network devices 106-1, 106-2 . . . 106-N to commence communication. Any network device in the plurality of network devices 106-1, 106-2 . . . 106-N may be configured to initiate and receive commands from any other device in the plurality of devices 106-1, 106-2 . . . 106-N, and the master controller 104 may monitor communication between the plurality of devices 106-1, 106-2 . . . 106-N. Although FIG. 1 shows the master controller 104 as a single functional block, it is to be understood that the functions of the master controller 104 may be, and in some embodiments are, provided by one or more separate components, e.g. a separate power supply and communication controller coupled to the bus 108.

The devices in the plurality of devices 106-1, 106-2 . . . 106-N receive power from the master controller 104 via the bus 108 and communicate via the bus 108 under the control of the master controller 104. The system 100 may operate using any number N of devices 106-1, 106-2 . . . 106-N and any type of device 106-1, 106-2 . . . 106-N having an appropriate interface, e.g. a DALI interface, to the master controller 104. In a DALI configuration, for example, the plurality of network devices 106-1, 106-2 . . . 106-N may include any DALI-compatible device such as but not limited to lighting devices, sensors, controllers, and/or shades, among others. Each device in the plurality of devices 106-1, 106-2 . . . 106-N may be assigned an associated address on the bus 108, in a known manner, to facilitate communication. Each device in the plurality of devices 106-1, 106-2 . . . 106-N may include an associated energy storage circuit 110-1, 110-2 . . . 110-N, respectively, such as but not limited to one or more capacitors. The plurality of network devices 106-1, 106-2 . . . 106-N may rely entirely on the bus voltage $V_{Bus}$ and energy stored in the associated energy storage circuits 106-1, 106-2 . . . 106-N for operation, i.e. the devices may not include any auxiliary power supply. The plurality of network devices 106-1, 106-2 . . . 106-N may be coupled to the bus 108 so that the energy storage circuits 110-1, 110-2 . . . 110-N are charged up to the nominal voltage of the bus 108 when the bus 108 is in a high voltage state (i.e. during periods of a logical "1" voltage level). The energy stored in the energy storage circuits 110-1, 110-2 . . . 110-N is discharged somewhat when the bus 108 is in a low voltage state (i.e. during periods of logical "0" voltage levels) to provide operating power for the plurality of network devices 106-1, 106-2 . . . 106-N. The high and low bus voltage levels may be any level appropriate to establish communication between the plurality of network 106-1, 106-2 . . . 106-N, and to charge the energy storage circuits 110-1, 110-2 . . . 110-N during time periods of high bus voltage. For example, in a DALI system, the high bus voltage may be 16V±6.5V and the low bus voltage may be 0V±4.5 V.

Full depletion of the energy stored in the energy storage circuits 110-1, 110-2 . . . 110-N (sometimes referred to herein as "starving" the device) during times when the bus 108 is in a low state may be prevented by adjusting, e.g. dynamically, the time between communication messages on the bus 108. In some embodiments, the master controller 104 is configured to establish a defined time between forward messages on the bus 108 to allow charging of the energy storage circuits 110-1, 110-2 . . . 110-N to a level sufficient to prevent starving during communication. The predefined time may, for example, be calculated using a model of the energy reserve in the energy storage circuits 110-1, 110-2 . . . 110-N for each device in the plurality of devices 106-1, 106-2 . . . 106-N, the type of command to be sent on the bus 108, the size of the command frame in bytes, and/or the size of the expected response package in bytes, and combinations thereof. Where the energy storage circuits 110-1, 110-2 . . . 110-N include one or more capacitors, the model may be simplified by a assuming a linear discharge of the capacitors. The predefined time may be adjusted dynamically for each command and for each device in the plurality of devices 106-1, 106-2 . . . 106-N so that the predefined time is long enough to replenish the energy stored in the energy storage circuits 110-1, 110-2 . . . 110-N and is not arbitrarily long so as to cause an arbitrary delay in communication.

Figure 2:
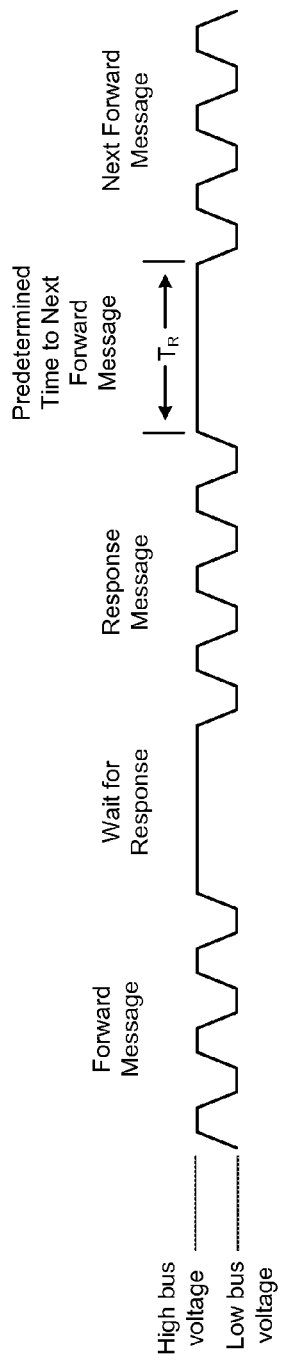
FIG. 2 is an example of a communication timing diagram associated with a system according to embodiments disclosed herein.

FIG. 2 illustrates an example of a timing diagram including a predefined recovery time $T_R$ set by a master controller 104 (FIG. 1). With reference to both FIGS. 1 and 2, the master controller 104 may declare the bus 108 open for communication and a device in the plurality of devices 106-1, 106-2 . . . 106-N may transmit a forward message to another device in the plurality of devices 106-1, 106-2 . . . 106-N. While the forward message is transmitted, the energy storage circuits 110-1, 110-2 . . . 110-N in the devices 106-1, 106-2 . . . 106-N may charge during times of high bus voltage and somewhat discharge during times of low bus voltage. After sending the forward message, the transmitting device in the plurality of devices 106-1, 106-2 . . . 106-N may await a response message, and the bus voltage $V_{Bus}$ may be maintained a high level. The response message may then be received.

The master controller 104 may calculate a predetermined recovery time $T_R$ for the plurality of devices 106-1, 106-2 . . . 106-N to ensure that the associated energy storage circuits 110-1, 110-2 . . . 110-N within the plurality of devices 106-1, 106-2 . . . 106-N are fully charged, e.g. to the nominal bus voltage. The master controller 104 may then declare the bus 108 closed for communication and the bus voltage $V_{Bus}$ may be maintained at a high voltage level for the predetermine recovery time $T_R$. After the predetermined recovery time $T_R$, the master controller 104 may declare the bus 108 open for communication and the next forward message may be transmitted on the bus 108. The master controller 104 may repeat this process for each command transmitted on the bus 108 so that the predetermined recovery time $T_R$ varies depending on the type of command, the command length, the type of response, the response length and/or the energy storage of the energy storage circuits 110-1, 110-2 . . . 110-N.

In some embodiments, for example, for each command associated with a device on the bus, the master controller 104 may calculate the predefined recovery time $T_R$ as:

$$T_R = K_1 * FM[\text{bytes}] + K_2 * RM[\text{bytes}] + K_3 \geq T_{min} \quad \text{(Equation 1)}$$

where FM[bytes] is the time required for transmission of the forward message accounting for the number of bytes in the forward message, RM[bytes] is the time required for transmission of the return message accounting for the number of bytes in the return message, $T_{min}$ is the minimum time required to fully charge the energy storage circuits 110-1, 110-2 . . . 110-N of the plurality of devices 106-1, 106-2 . . . 106-N and $K_1$, $K_2$ and $K_3$ are constants defined based on a characterization of the capacitive load of the plurality of devices. K1 and K2 are proportionally calculated based on the energy discharged by the energy storage circuit 110-1, 110-2 . . . 110-N in a device in the plurality of devices 106-1, 106-2 . . . 106-N and the current limit implemented in the device in the plurality of devices 106-1, 106-2 . . . 106-N. K3 may be selected as an indicator of the responsiveness of the output circuit of the master controller 104 (FIG. 1).

To avoid arbitrarily long recovery times, the calculated predetermined recovery time $T_R$ may be set to be greater than or equal to $T_{min}$ but less than $T_{min}$ plus a predetermined time period. The predetermined recovery time $T_R$ may be calculated for each message and/or the master controller 104 may calculate and store predetermined recovery times $T_R$ associated with each type of message and apply the stored predetermined recovery time $T_R$ associated with each message when the message appears on the bus 108. In addition or alternatively, the master controller 104 may calculate the predetermined recovery time $T_R$ for each command using dynamic identification of the devices 106-1, 106-2 . . . 106-N. For example, each device 106-1, 106-2 . . . 106-N may be identified by the master controller 104 and may have a known associated recovery time. When a device in the plurality of devices 106-1, 106-2 . . . 106-N communicates on the bus 108, the controller may identify the device in the plurality of devices 106-1, 106-2 . . . 106-N and calculate the predetermined recovery time $T_R$ from the known recovery time associated with that device. Dynamic evaluation of the energy storage load in this manner allows for optimizing use of the bus in some configurations, thereby resulting in fast throughput.

In some embodiments, the combined energy required by the devices in the plurality of devices 106-1, 106-2 . . . 106-N after depletion of the energy storage circuits 110-1, 110-2 . . . 110-N is greater than a current limit set in the master controller 104. For example, in a master controller 104 using fold-back protection, the output current $I_{Bus}$ and output voltage $V_{Bus}$ may drop during communication and may not return to the normal levels until a time period after the response message on the bus 108. In this situation, the bus voltage $V_{Bus}$ and current $I_{Bus}$ may be recovering from the fold back mode during the predetermined time $T_R$ to the next forward message, and, as a result, may not supply sufficient current to fully charge the energy storage circuits 110-1, 110-2 . . . 110-N before the next forward message. Embodiments may, therefore, wait for an extra recovery time after a response message before sending the next forward message. The extra recovery time may provide time for the output voltage $V_{Bus}$ and current $I_{Bus}$ to substantially (e.g., within 10%) return to the nominal levels existing prior to the master controller 104 entering a fold-back mode. In some embodiments, for example, the master controller 104 may monitor the bus voltage $V_{Bus}$ and wait for the bus voltage $V_{Bus}$ to return substantially to the nominal levels. The time it takes for the bus voltage $V_{Bus}$ to return to substantially nominal levels may be the extra recovery time. After the extra recovery time, the system may wait for the calculated predetermined time $T_R$ to the next forward message before sending the next message to allow time for the energy storage circuits 110-1, 110-2 . . . 110-N in the devices in the plurality of devices 106-1, 106-2 . . . 106-N to fully charge.

Figure 3:
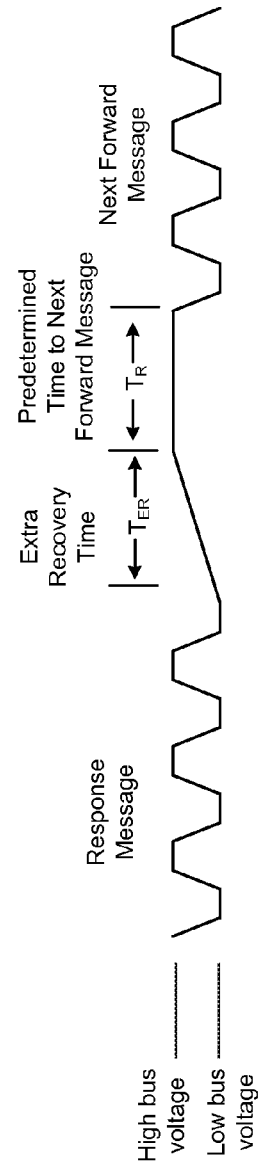
FIG. 3 is another example of a communication timing diagram associated with a system according to embodiments disclosed herein.

FIG. 3 illustrates a timing diagram including an extra recovery time $T_{ER}$ set by a master controller 104 (FIG. 1). With reference to both FIGS. 1 and 3, the master controller 104 is configured to monitor the bus voltage $V_{Bus}$ after a response message, and wait an extra recovery time $T_{ER}$ for the bus voltage $V_{Bus}$ to return to substantially nominal levels. After the extra recovery time $T_{ER}$, the master controller 104 may continue to declare the bus 108 closed for communication and the bus voltage $V_{Bus}$ may be maintained at a high voltage level for another period of time. In FIG. 3, for example, after the extra recovery time $T_{ER}$ the master controller 104 continues to declare the bus 108 closed for communication for the predetermined recovery time $T_R$ discussed in connection with FIG. 4. After the predetermined recovery time $T_R$, the master controller 104 may declare the bus 108 open for communication and the next forward message may be transmitted on the bus 108. The master controller 104 may repeat this process for each command transmitted on the bus 108 so that the extra recovery time $T_{ER}$ may vary depending on how long it takes for the bus voltage $V_{Bus}$ to return to substantially nominal levels, and to establish and to recalculate the predetermined recovery time $T_R$ for each command depending on the type of command, the command length, the type of response, the response length and/or the energy storage of the devices in the plurality of devices 106-1, 106-2 . . . 106-N.

Figure 4:
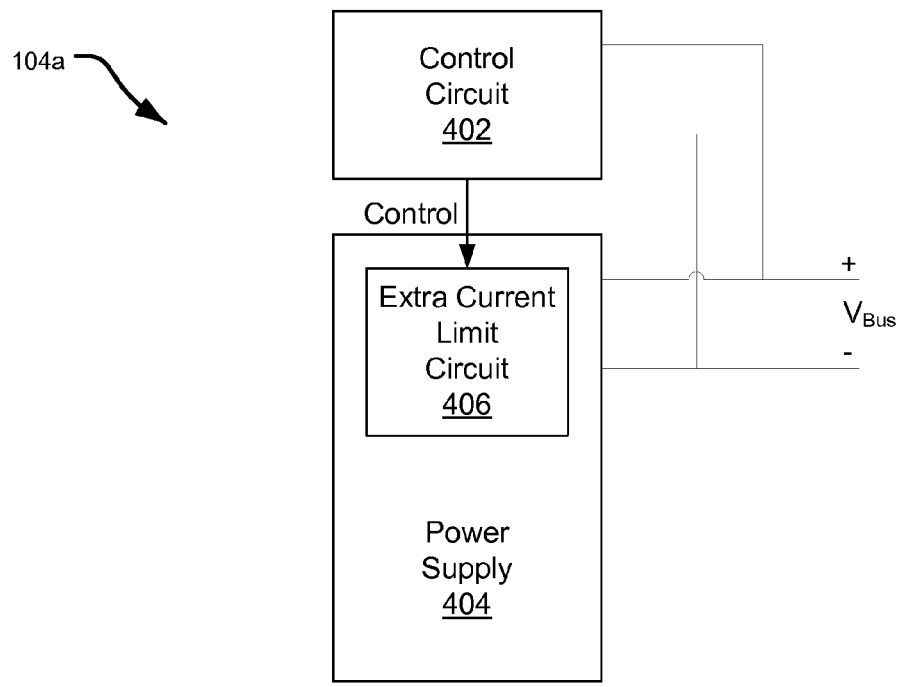
FIG. 4 is block diagram of a portion of a master controller according to embodiments disclosed herein.

In addition or as an alternative to waiting for the extra recovery time $T_{ER}$, in embodiments where the combined energy required by the devices in the plurality of devices 106-1, 106-2 . . . 106-N after depletion of the energy storage circuits 110-1, 110-2 . . . 110-N is greater than a current limit set on the master controller 104, the master controller 104 may implement an extra current limit circuit (which, in some embodiments, is part of the master controller 104). In general, the extra current limit circuit may be configured to dynamically increase the output current limit of the master controller 104 whenever the current limit is insufficient to fully charge the energy storage circuits 110-1, 110-2 . . . 110-N in the plurality of devices 106-1, 106-2 . . . 106-N. FIG. 4, for example, illustrates a portion of a master controller 104a including a control circuit 402, a power supply 404, and an extra current limit circuit 406. In FIG. 4, the power supply 404 may be configured with a set output current limit and fold-back capability. With reference to both FIG. 1 and FIG. 4, when the combined energy required by the plurality of devices 106-1, 106-2 . . . 106-N is greater than the current limit on the power supply 404, the control circuit 402 may provide a control output to the extra current limit circuit 406 to increase the output current limit of the power supply 404 and thereby charge the energy storage circuits 110-1, 110-2 . . . 110-N in the plurality of devices 106-1, 106-2 . . . 106-N. In FIG. 4, for example, the control circuit 402 may monitor the bus voltage $V_{Bus}$ and may provide the control output to the extra current limit circuit 406 whenever the bus voltage $V_{Bus}$ is substantially below nominal levels, e.g. by 10% or more.

The configuration of the extra current limit circuit 406 may vary depending on specific configuration of the power supply 404. One prior art configuration for a portion of a power supply 404a is illustrated in FIG. 5, and an extra current limit circuit 406a consistent with the present disclosure and useful in connection with the configuration of the power supply 404a of FIG. 5 is illustrated in FIG. 6.

Figure 5:
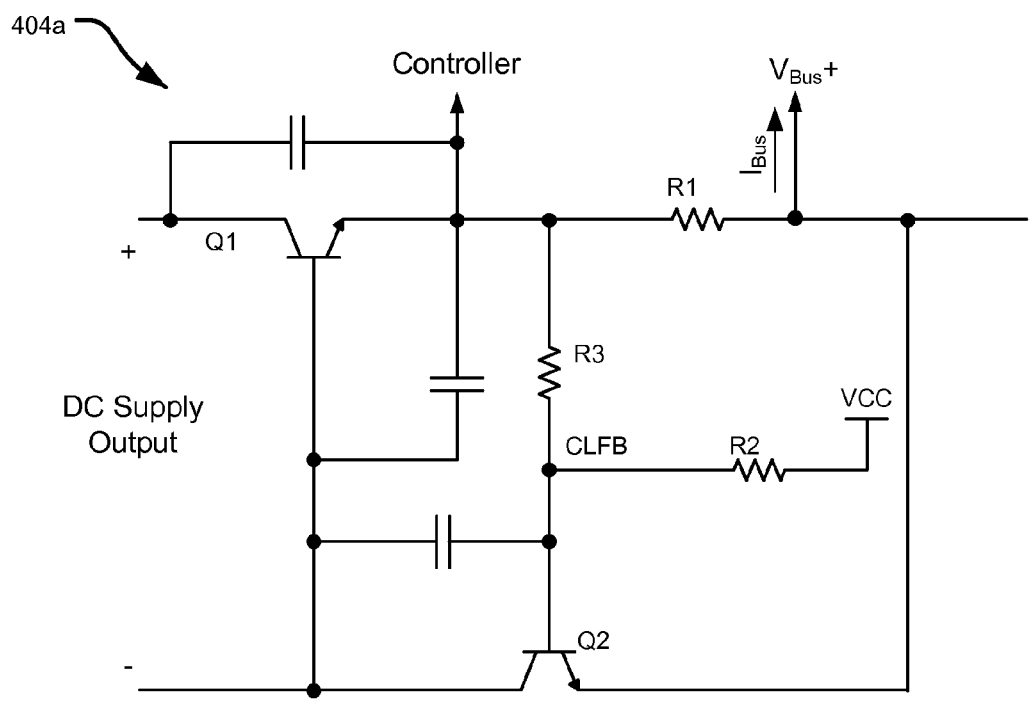
FIG. 5 is diagram of a prior art circuit for providing current limiting and fold-back capability in a power supply according to embodiments disclosed herein.

The prior art configuration of the power supply 404a illustrated in FIG. 5 is a well-known configuration for implementing current limit and fold-back capability in a power supply, which includes a passing transistor Q1 and a current limit transistor Q2. The passing transistor Q1 and the current limit transistor Q2 are both bi-polar junction transistors (BJTs) in FIG. 5. The positive output of a DC power supply is coupled to a collector of the passing transistor Q1 and the negative output of the DC power supply is coupled to a collector of the current limit transistor Q2. An emitter of the passing transistor Q1 is coupled to a controller and to a shunt resistor R1. The output voltage, i.e. the positive output of the bus voltage $V_{Bus}+$ is provided on the side of the shunt resistor R1 that is not connected to an emitter of the passing transistor Q1. In general, a limit on the output current $I_{Bus}$ is set by the shunt resistor R1. As the output current $I_{Bus}$ approaches the current limit, the current limit transistor Q2 conducts to steal current from a base of the passing transistor Q1, thereby reducing the output current $I_{Bus}$. In fold-back mode, the shunt resistor R1, and resistors R2 and R3, cause the current limit transistor Q2 to conduct to steal current from the base of the passing transistor Q1, thereby reducing the output voltage $V_{Bus}$ and current $I_{Bus}$.

Figure 6:
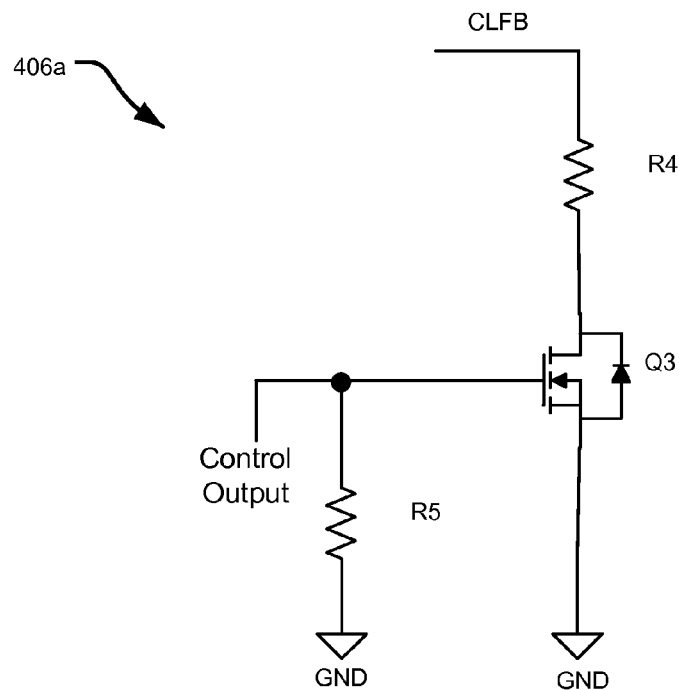
FIG. 6 is circuit diagram of an extra current limit circuit according to embodiments disclosed herein.

The extra current limit circuit 406a of FIG. 6 may be implemented in a power supply configuration 404a as shown in FIG. 5 to dynamically increase the output current limit of the power supply 404a. The embodiment 406a illustrated in FIG. 6 includes a metal oxide field effect (MOSFET) switch Q3 and resistors R4 and R5. A source of the MOSFET switch Q3 is coupled to ground and a drain of the MOSFET switch Q3 is coupled through the resistor R4 to a current limit fold-back node CLFB of FIG. 5, which is the base of the current limit transistor Q2 in FIG. 5. A gate of the MOSFET switch Q3 is coupled to the control circuit 402 (FIG. 4) for receiving the control output and is also coupled to ground through the resistor R5. With continued reference to FIGS. 4-6, when the control circuit 402 provides the control output to the base of the MOSFET switch Q3, the MOSFET switch Q3 conducts and essentially couples the CLFB node and the base of the current limit transistor Q2 in FIG. 5 to ground through the resistor R4. This steals current form the base of the current limit transistor Q2 in FIG. 5, thereby delaying conduction of the current limit transistor Q2 and increasing the current limit of the circuit of FIG. 5. The control circuit 402 may provide the control output, for example, whenever the bus voltage $V_{Bus}$ decreases below some predetermined level to thereby dynamically increase the output current limit of the power supply 404.

With reference to FIGS. 1 and 4, in systems wherein the plurality of devices 106-1, 106-2 . . . 106-N may communicate at the same time, the control circuit 402 may provide the control output to increase the power supply 404 current limit in a manner that avoids violation of a defined communication protocol or to avoid disruption of communication. For example, in a system wherein two devices 106-1 and 106-2 communicate on a bus 108 at the same time, the control circuit 402 may increase the power supply 404 current limit only during the second half of each logical one, or within predefined minimum recovery times. In addition, or alternatively, a master controller 104 could initiate and shortly thereafter terminate communication. The recovery period following the incomplete communication could provide additional energy to plurality of devices 106-1, 106-2 . . . 106-N to prevent starvation.

Figure 7:
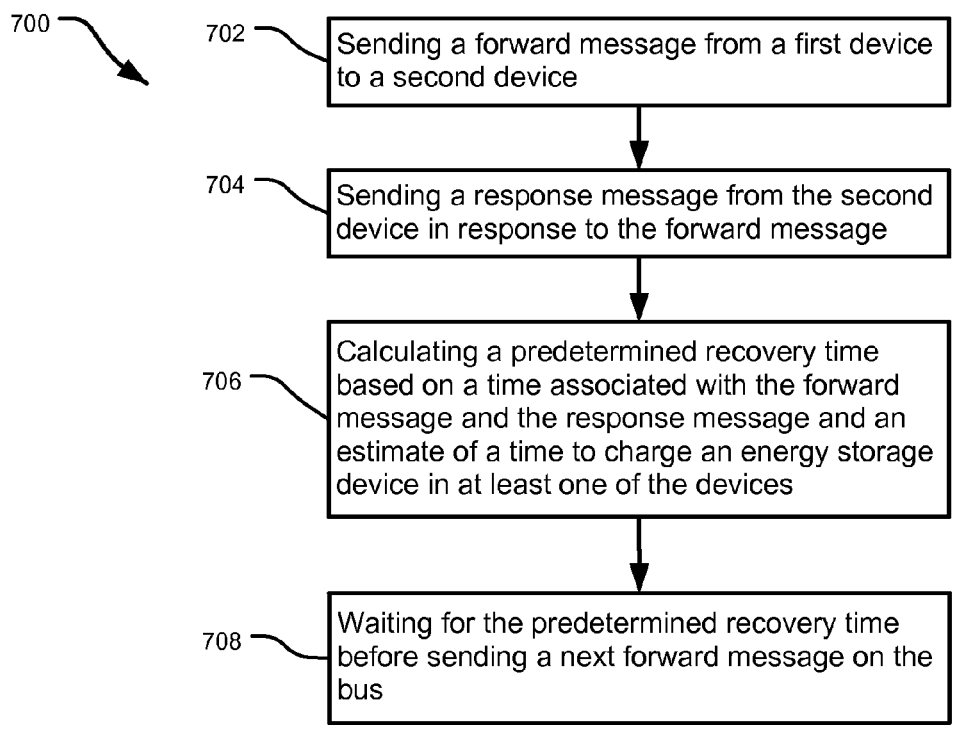
FIG. 7 is a flowchart illustrating a method of delivering energy to devices according to embodiments disclosed herein.
Figure 8:
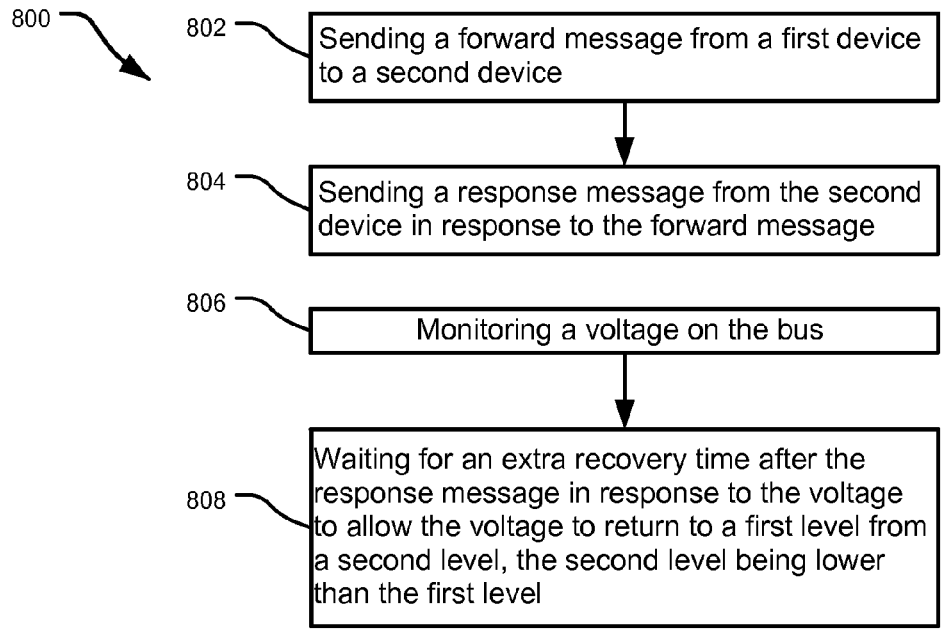
FIG. 8 is a flowchart illustrating another method of delivering energy to devices according to embodiments disclosed herein.
Figure 9:
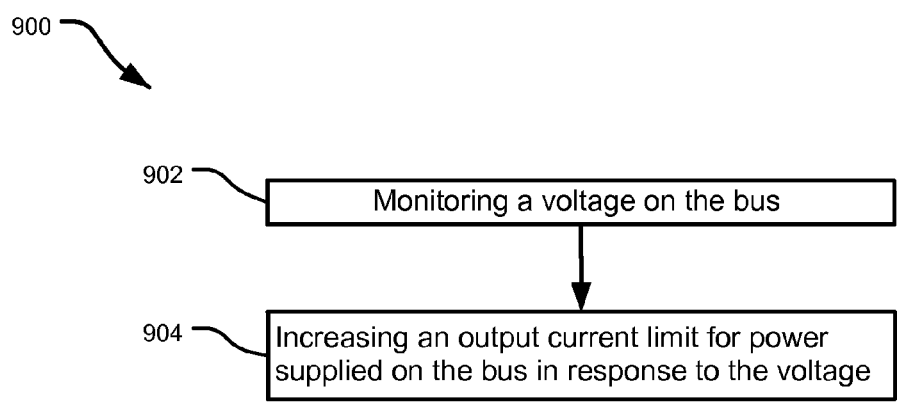
FIG. 9 is a flowchart illustrating another method of delivering energy to devices according to embodiments disclosed herein.

FIGS. 7, 8 and 9 are flowcharts illustrating embodiments of methods of communicating between devices over a bus that is also used to power the devices. The illustrated flowcharts may be shown and described as including a particular sequence of steps. It is to be understood, however, that the sequence of steps merely provides an example of how the general functionality described herein may be implemented. The steps do not have to be executed in the order presented unless otherwise indicated. Also, the illustrated methods may be implemented alone or with each other in any combination.

FIG. 7 illustrates a method 700 where a forward message is sent 702 from a first device to a second device and a response message is sent 704 from the second device in response to the forward message. A predetermined recovery time is calculated 706 based on a time associated with the forward message and the response message and an estimate of a time to charge an energy storage circuit in at least one of the devices. Expiration of the predetermined recovery time is awaited 708 before sending a next forward message on the bus.

FIG. 8 illustrates a method 800 where a forward message is sent 802 from a first device to a second device and a response message is sent 804 from the second device in response to the forward message. A voltage on the bus is monitored 806 and expiration of an extra recovery time after the response message is awaited 808 in response to the voltage to allow the voltage to return to a first level from a second level, the second level being lower than the first level.

FIG. 9 illustrates a method 900 where a voltage on the bus is monitored 902, and an output current limit for power supplied on the bus is increased 904 in response to the voltage.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or the "microprocessor" and the "processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system comprising:
a bus;
a plurality of devices coupled to the bus and configured to communicate with each other via the bus via one or more messages; and
a master controller coupled to the bus and configured to supply power to the plurality of devices via the bus and to control communication between the plurality of devices, wherein the master controller is configured to calculate a predetermined recovery time ($T_R$) based on a message time and an estimate of a time to charge an energy storage circuit in at least one of the devices in the plurality of devices, wherein the message time comprises a duration during which a first device in the plurality of devices sends a forward message to a second device in the plurality of devices and another duration during which the second device sends a response message to the first device, wherein the master controller is further configured to cause the plurality of devices to wait for the predetermined recovery time ($T_R$) after the end of a message is sent between the plurality of devices and before the beginning of a subsequent message is sent by any of the plurality of devices,
wherein the master controller re-calculates the predetermined recovery time when a monitored value of the bus falls below a threshold level.

2. The system of claim 1, wherein the master controller is further configured to monitor a voltage on the bus after the end of the message and before the beginning of the subsequent message and, in response to the monitored voltage, cause the plurality of devices to wait for an extra recovery time ($T_{ER}$) before the predetermined recovery time ($T_R$) to allow the voltage to return to a first level from a second level, the second level being lower than the first level.

3. The system of claim 2, wherein the master controller further comprises an extra current limit circuit configured to increase an output current limit for the power supplied by the master controller in response to a control output of a controller, the control output being provided by the master controller in response to the monitored voltage on the bus.

4. The system of claim 1, wherein the master controller further comprises an extra current limit circuit configured to increase an output current limit for the power supplied by the master controller in response to a control output of a controller, the control output being provided by the controller in response to a voltage on the bus.

5. The system of claim 4, wherein the extra current limit circuit comprises a metal oxide field effect (MOSFET) transistor switch, and wherein the control output is coupled to a gate of the MOSFET transistor switch.

6. The system of claim 1, wherein the response message is communicated by the second device in response to the forward message communicated from the first device.

7. A method of delivering energy to a plurality of devices via a bus that is also used for communication between the devices, the method comprising:
sending a message on the bus, wherein sending the message on the bus comprises:
sending a forward message from a first device in the plurality of devices to a second device in the plurality of devices; and
sending a response message from the second device in response to the forward message;
calculating a predetermined recovery time ($T_R$) based on a message time and an estimate of a time to charge an energy storage circuit in at least one of the devices in the plurality of devices, wherein the message time comprises a duration of the sending of the forward message and another duration of the sending of the response message;
waiting for the predetermined recovery time ($T_R$) before sending a subsequent message on the bus; and
re-calculating the predetermined recovery time when a monitored value of the bus falls below a threshold level.

8. The method of claim 7, further comprising:
monitoring a voltage after the end of the sending the message and before the beginning of the subsequent message on the bus; and
waiting for an extra recovery time ($T_{ER}$) in response to the monitored voltage before the predetermined recovery time ($T_R$) to allow the voltage to return to a first level from a second level, the second level being lower than the first level.

9. The method of claim 8, further comprising:
increasing an output current limit for power supplied on the bus in response to the monitored voltage.

10. The method of claim 7, further comprising:
increasing an output current limit for power supplied on the bus in response to a voltage.

11. The system of claim 1, wherein the master controller is configured to store the predetermined recovery time ($T_R$) associated with each message and apply the stored predetermined recovery time ($T_R$) associated with each message when each message is sent on the bus.

12. The system of claim 1, wherein each of the devices in the plurality of devices comprises a known recovery time and the master controller is configured to calculate the predetermined recovery time ($T_R$) from the known recovery time of each device when each of the devices is communicating on the bus.

13. The method of claim 7, further comprising:
storing the predetermined recovery time ($T_R$) associated with each message; and
applying the stored predetermined recovery time ($T_R$) associated with each message when each message is sent on the bus.

14. The method of claim 7, further comprising:
calculating the predetermined recovery time ($T_R$) from a known recovery time of each of the devices in the plurality of devices when each device is communicating on the bus.

* * * * *